UNITED STATES PATENT OFFICE.

FRANCIS J. STRAUB, OF NEW KENSINGTON, PENNSYLVANIA.

BUILDING-BLOCK AND METHOD OF MAKING THE SAME.

1,212,840.     Specification of Letters Patent.     Patented Jan. 16, 1917.

No Drawing.     Application filed November 9, 1915. Serial No. 60,513.

*To all whom it may concern:*

Be it known that I, FRANCIS J. STRAUB, a citizen of the United States, residing at New Kensington, in the county of Westmoreland and State of Pennsylvania, have invented certain new and useful Improvements in Building-Blocks and Methods of Making the Same, of which the following is a specification.

My invention has in view to provide a building block, brick or slab composed of a mixture of lump and fine cinder, cement, and water, without the use of sand or any other material, and consists in the process of manufacturing the same and the resulting product.

Ordinarily, concrete mixtures of various kinds utilize sand, crushed stone, or other mineral as a body or filler, either wholly or partly in combination with the required proportion of cement as a binder. In carrying out my invention, I use coal cinders or ashes which are first crushed or ground to a consistency composed of pieces not larger than say three-quarters inch and retaining all of the smaller sizes and the dust and fine ashes, which are otherwise ordinarily thrown away as refuse. This crushed material, after reducing the larger lumps and clinkers, which are more or less porous, provides the coarser pieces or lumps of a maximum size sufficiently small to enable the cement to penetrate through their pores and interstices and bind the entire mass in a homogeneous body. The ground mixture also retains all of the usual accompanying adhering portions of the cinders, in the resulting product and it is essential that the original mass of cinders and ashes as it comes from the furnace, grate bars, or other source remains in the resulting mixture without separation or change of proportions.

A suitable proportion of cement, say one-sixth, is added with the necessary water, and the batch is then very thoroughly mixed. The retained finer cinder and ashes, combined with the cement, thoroughly mixes with the larger pieces, providing a uniform quality of all sizes throughout, and measured portions of the resulting mass are molded into block-, brick- or slab-form and then dried.

Owing to the absence of sand or other similar mineral material, the resulting blocks, etc., harden by natural evaporation and at the same time retain the porous light qualities of the original cinders to a very considerable degree, while at the same time having the necessary strength and resistance to crushing strains. The presence of the larger lumps regularly mixed throughout the mass maintain sufficient porosity to insure avoidance of moisture, while the light consistence of the entire body and the avoidance of great density and accompanying resistance by elimination of sand or the like, leaves the block in a condition of penetrability or cleavage by any sharp instrument. It can therefore be driven into by a nail, or easily cut, without impairing its strength or homogeneity, so that it may be easily used for attachment of wooden trim, etc., without the necessity of supplemental nailing strips or the like. The surface, being rough and uneven, is likewise of great holding affinity for plaster or other like coating material, so that the blocks are well adapted to building purposes. They are fireproof, moisture proof and sound proof, and, due to the low cost of the raw material and labor, are extremely cheap.

What I claim is:

1. The herein described process of making building blocks and the like consisting in crushing or grinding an original mass of coal cinder and ashes without separation, mixing the entire mass of coarse and fine material with a suitable proportion of cement and water, and molding and drying the same in block form.

2. A building block composed of a mixture of coarse and fine coal cinder and ashes, retaining all of the original mass, cement, and water.

3. A building block consisting of a mixture of coal cinders and ashes taken in its original composition as products of combustion and crushed to a consistency ranging from dust to lumps of about three quarter inch in size and retaining all of the original mass in its natural resulting combination, and then mixed with a suitable proportion of cement and water and molded in block form, substantially as set forth.

In testimony whereof I hereunto affix my signature in the presence of two witnesses.

FRANCIS J. STRAUB.

Witnesses:
W. A. HECKMAN,
C. M. CLARKE.

Copies of this patent may be obtained for five cents each, by addressing the "Commissioner of Patents, Washington, D. C."